UNITED STATES PATENT OFFICE.

HARVEY DECKER, OF JERSEY CITY, NEW JERSEY.

IMPROVEMENT IN PROCESSES OF MAKING BIRCH BEER.

Specification forming part of Letters Patent No. 183,840, dated October 31, 1876; application filed August 21, 1876.

*To all whom it may concern:*

Be it known that I, HARVEY DECKER, of Jersey City, in the county of Hudson and State of New Jersey, have invented a new and Improved Birch Beer, of which the following is a specification:

This invention relates to fermented beverages; and it consists in a composition formed by mixing a decoction of black-birch bark and hops, and causing the mixture thus formed to ferment by the addition of yeast, and afterward adding sugar, oil of winter-green, (*Gaultheria*,) malt, and coloring matter, as hereinafter more fully described.

To prepare the birch beer, I place in a brass kettle, or other unoxidizable vessel, eight quarts of ground black-birch bark, from which the ross has been previously removed, and add one pound of hops, and pour in a quantity of water, and place it on a stove, and allow it to stew for a little time, taking great care to not let it boil. I then pour off the decoction thus made into a cask, which I call a "settler," leaving the hops and the bark in the kettle. I then add a fresh quantity of water to the hops and bark, stew it and pour it off again, and repeat the operation until the full strength of the material is obtained.

The liquor in the setter is then allowed to cool, so that it will not scald the yeast. I then add two or three quarts of yeast made as follows: I take chopped rye, molasses, and a decoction of hops and mix them, and allow the mixture to ferment. To make cakes from which to make the yeast, I take eight ounces of good hops, and boil in a brass kettle with eight quarts of water and allow it to cool, and, when milk-warm, put with the decoction a small quantity of the fermented mixture above described, and stir in rye-flour to a thick batter; let it get light; then mix in Indian meal until it is about as stiff as bread; and let it get light again; then roll and make into cakes the size of the hand. Dry the cakes in the shade, and turn them often while drying.

These cakes should be made every six weeks, as they are not so good when they become old.

To prepare the yeast from these cakes for use in making the beer, I take one or two yeast-cakes prepared as above, and soak them in warm water. When dissolved, I add rye-flour to form a thick batter, let it get light, and then add it to the decoction of birch-bark and hops. I let the liquor stand for one or two hours, and then dip or drain it off into a cask that will hold forty-five gallons. I then take thirty-five pounds of white A sugar, and thoroughly incorporate with it three-fourths ounce of oil of winter-green, (*Gaultheria*,) and let it stand for an hour or more, to become thoroughly absorbed by the sugar. I then add it to the liquor, and at the same time add two quarts of malt which has been previously scalded, and also a suitable quantity of coloring matter, consisting of burnt sugar. I then fill the cask with water, and incorporate the whole thoroughly, and let it stand for one or more hours, and bottle for use.

Having thus described my invention, what I claim as new, and desire to secure by Letters Patent, is—

The process herein described of making beer from ground birch-bark, which consists in first extracting the strength thereof in hops and water without boiling; secondly, fermenting the liquor obtained with yeast; and, thirdly, in adding malt and sugar, the latter having been previously made to absorb oil of winter-green, as set forth.

HARVEY DECKER.

Witnesses:
GEO. M. HOPKINS,
ALEX. F. ROBERTS.